(12) United States Patent
Toda et al.

(10) Patent No.: US 6,465,906 B1
(45) Date of Patent: Oct. 15, 2002

(54) ALIGNMENT DEVICE FOR A VEHICLE

(75) Inventors: Atsushi Toda; Hideaki Takeuchi, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 37 days.

(21) Appl. No.: 09/641,650

(22) Filed: Aug. 18, 2000

(30) Foreign Application Priority Data

Aug. 30, 1999 (JP) ............................................. 11-242580

(51) Int. Cl.⁷ ................................................. B60L 1/00
(52) U.S. Cl. ...................................... 307/10.1; 307/125
(58) Field of Search ............................. 307/10.1, 10.8, 307/157, 116, 125; 315/77–80, 82; 362/61, 66, 71, 233, 276, 285, 384, 439, 464–467; 356/155; 33/286, 288; 701/36, 49, 124

(56) References Cited

U.S. PATENT DOCUMENTS 3,749,914 A * 7/1973 Terasaki ..................... 244/1 R
4,075,469 A * 2/1978 Alphen ....................... 362/276
4,538,573 A * 9/1985 Merrick ..................... 123/406.5
5,633,710 A * 5/1997 Kumra et al. ................. 315/82
6,332,698 B1 * 12/2001 Toda et al. .................. 362/465

FOREIGN PATENT DOCUMENTS

JP 11-208365 A * 8/1999

OTHER PUBLICATIONS

Clippedimage=JP411208365A, English translation of abstract of JP–11–208365–A.*

* cited by examiner

Primary Examiner—Fritz Fleming
Assistant Examiner—Sharon Polk
(74) Attorney, Agent, or Firm—Fish & Richardson P.C.

(57) ABSTRACT

A device for aligning an optical axis of a light source according to the change of attitude of a vehicle is described. The device is of simple construction and is positionally accurate. In an embodiment, a controller 18 performs an alignment operation according to an output signal from a vehicle height sensor 10 and an alignment command signal (PWM signal). The PWM signal has a pulse duration that has been modulated according to this operation, and the result is input to a D/A converter 20. A transistor Q of a D/A converter 20 responds to the PWM signal and performs a switching operation, and a signal accompanying this switching operation is smoothed by a charge and discharge circuit comprising resistance R1 and R2, and a condenser C. The smoothed signal is output from both ends of the condenser C to an actuator 14, and a motor 26 is driven to rotate according to the deviation between the output of a potentiometer 24 and the voltages at both ends of the condenser C.

5 Claims, 4 Drawing Sheets

ALIGNMENT DEVICE FOR A VEHICLE

BACKGROUND OF THE INVENTION

The present invention relates to an alignment device for a vehicle, and particularly to an alignment device for a vehicle suitable to align an optical axis of a headlamp for an automobile.

In some vehicles such as an automobile or the like, an alignment device (auto leveling device) is mounted to prevent the direction of irradiation of light of a headlamp from becoming irregular due to changes in the running attitude of the vehicle. The alignment device corrects the direction of light irradiated by the headlamp according to the changes in the running attitude of the vehicle. For example, vehicle height sensors arranged at axle portions in the front and in the rear of the vehicle generate detection signals that correspond to the change of a pitting angle (or pitch angle) of the vehicle, and the direction of light irradiated by the headlamp is controlled according to this change.

Specifically, the alignment device shown in FIG. 4 includes a vehicle height sensor 50, a control unit 52 and an actuator 54. Electric power is supplied to the control unit 52 and the actuator 54 from a vehicle power supply. The control unit 52 includes a controller 62 comprising resistances 56 and 58, a stabilized power supply 60 and a microcomputer, and a D/A converter 64. The stabilized power supply 60 stabilizes voltage upon reception of a supply of the electric power from the vehicle power supply, and outputs the stabilized voltage to the controller 62 and to the D/A converter 64. The controller 62 receives the voltage divided by the resistances 56 and 58 therein, monitors the voltage change of the vehicle power supply in accordance with this voltage, converts a detection signal of the vehicle height sensor 50 to a digital signal, performs an alignment operation, for example, alignment according to the change of the pitting angle of the vehicle on the basis of the digital signal, and outputs a digital signal in accordance with this operation result to the D/A converter 64. The D/A converter 64 converts the digital signal from the controller 62 to an analog signal and outputs this analog signal to a motor driver 66 of the actuator 54.

The motor driver 66 compares the analog signal output from the D/A converter 64 with the rotational position of a motor detected by a potentiometer 68, and drives a motor 70 according to the result of the comparison. Consequently, the motor driver 66 drives the motor 70 so that the output signal of the D/A converter 66 conforms to the position detected by the potentiometer 68. The motor 70 tilts a reflector within a lamp body up and down, so that the optical axis of the lamp is aligned according to the change of the vehicle height.

In the conventional alignment device, a constant voltage is always supplied to the controller 62 by the stabilized power supply 60. Therefore, even if the voltage of the vehicle power supply varies, no error is produced in the operation result of the controller 62. However, since the vehicle power supply is directly supplied to the motor driver 66 and potentiometer 68 in the actuator 54, the detection value of the potentiometer 68 is under the influence of variations of the supply voltage. The conventional alignment device includes a voltage divided by the resistances 56 and 58 that is input to the controller 62, and thus the controller 62 monitors the voltage variation of the vehicle power supply and corrects the operation value according to the variation of the supply voltage. Therefore, in the conventional alignment device, in order to monitor the variation of the supply voltage. the resistances 56 and 58 must be provided to serve in a supply voltage monitor circuit so that the controller 52 can perform the correction operation.

Further, referring to FIG. 5, the D/A converter 64 of the conventional alignment device is composed of a rudder circuit 72 comprising a plurality of resistance elements and an operation amplifying circuit 74. Consequently, the number of parts is increased and the positional accuracy of the actuator 54 is decreased by the supply voltage.

For example, in case that the supply voltage of the controller 62 is 5V, the D/A converter 64 performs a digital/analog conversion on the basis of 5V. Conversely, since the actuator 54 operates at the voltage (battery voltage) of the vehicle power supply, an operational amplifier 74 is required, which converts the analog voltage which is 5V at its maximum into the highest value of the operation voltage in the system. Such circuitry is required because, if the actuator 54 is designed to operate at 5V, the motor 70 would have to be large which is not practical. When the stroke of the actuator 54 is 0, in the case that the operational voltage range of the system is 8V to 16V in order to output a signal corresponding to the battery voltage from the D/A converter 64, the gain of the operational amplifier 74 is 3.2 times. Since the actuator 54 operates on the basis of the battery voltage, and the amplification factor of the operational amplifier 74 is fixed, when the battery voltage is 8V, which is the lowest in the system operational voltage range, the digital value when the stroke of the actuator 54 is 0 must be half as large as one when the supply voltage is 16V. If not half, the output voltage of the D/A converter 64 does not approach that of the battery voltage. Accordingly, in case that a D/A converter of 8 bits resolution is used, the output voltage can be naturally adjusted at 256 gradations. However, the output voltage can be changed only by 128 gradations which is half of 256 gradations, so that the positional accuracy of the actuator 54 is lowered by half.

SUMMARY OF THE INVENTION

The invention has been made in view of the problem of the above prior art. In particular, presented is an alignment device for a vehicle which can align an optical axis of a light source according to the change of attitude of a vehicle without lowering the positional accuracy, and the alignment device offers a simple construction.

In order to achieve the above result, the alignment device for a vehicle according to the first aspect of the invention is designed to include a vehicle attitude detecting means for detecting an attitude of a vehicle and then outputting a vehicle attitude detecting signal of analog amount; an analog-to-digital conversion means for converting the vehicle attitude detecting signal to a digital signal; an operation means for executing alignment operation in accordance with the digital signal and outputting an alignment command signal of which the pulse duration has been modulated according to this operation result; a switching means which responds to the alignment command signal upon reception of electric power from a vehicle power supply to perform a switching operation and outputs a signal according to this switching operation; a filter means for smoothing the signal accompanying the switching operation of this switching means; an alignment means for aligning an optical axis in response to an alignment signal; a position detecting means for detecting the position of the optical axis upon reception of supply of the electric power from the vehicle power supply; and an alignment signal generating means which generates an alignment signal corresponding to the deviation between the output signal of the filter means and the detection output of the position detecting means and outputs it to the alignment means.

In a process in which the switching means performs the switching operation in response to the alignment command signal of which pulse duration has been modulated and the signal accompanying the switching operation of this switching means is smoothed by the filter means, when the supply voltage of the vehicle power supply varies, the signal accompanying the switching operation is smoothed in accordance with the variation of this supply voltage, and the variation of the supply voltage is absorbed by the smoothed signal. Therefore, by generating the alignment signal corresponding to the deviation between the output signal of the filter means and the detection output of the position detecting means, it is possible to prevent a reduction in the positional accuracy of the optical axis and it is also possible to reduce the number of the parts since it is not necessary to monitor the variation of the supply voltage of the vehicle power supply.

The alignment device for a vehicle according to the second aspect of the invention is designed to include a vehicle height detecting means for detecting the vehicle height and outputting an analog vehicle height detecting signal; an analog-to-digital conversion means for converting the vehicle height detecting signal to a digital signal; an operation means for executing an alignment operation in accordance with the digital signal and outputting an alignment command signal having a pulse duration that has been modulated according to this operation result; a switching means which responds to the alignment command signal upon reception of electric power from a vehicle power supply to perform a switching operation and outputs a signal according to this switching operation; a filter means for smoothing the signal accompanying the switching operation of the switching means; an alignment means for aligning an optical axis in response to an alignment signal; position detecting means for detecting the position of the optical axis upon reception of the electric power from the vehicle power supply; and an alignment signal generating means which generates an alignment signal corresponding to the deviation between the output signal of the filter means and the detection output of the position detecting means and outputs it to the alignment means.

In the process in which the switching means performs the switching operation in response to the alignment command signal having a modulated pulse duration and the signal accompanying the switching operation of this switching means is smoothed by the filter means, when the supply voltage of the vehicle power supply varies, the signal accompanying the switching operation is smoothed in accordance with the variation of the supply voltage, and the variation of the supply voltage is absorbed by the smoothed signal. Therefore, by generating the alignment signal corresponding to the deviation between the output signal of the filter means and the detection output of the position detecting means, it is possible to prevent a reduction in the positional accuracy of the optical axis and it is also possible to reduce the number of parts since it is not necessary to monitor the variation of the supply voltage of the vehicle power supply.

The alignment device for a vehicle according to the third aspect of the invention is, in the alignment device for vehicle according to the first or second aspect of the invention, so designed that the filter means includes a charge and discharge circuit for charging and discharging an electric current from the vehicle power supply according to the switching operation of the switching means. The time constant of this charge and discharge circuit is set to be faster than a response speed of the alignment means which responds to the alignment signal.

In the case where the time constant of the charge and discharge circuit is faster than the response speed of the alignment means, the alignment means does not repeat an on/off operation many times due to the alignment signal but the optical axis of the lamp can still be quickly aligned in the target position.

Examples for carrying out the invention will be described below with reference to an embodiment.

DETAILED DESCRIPTION

Figure 1:
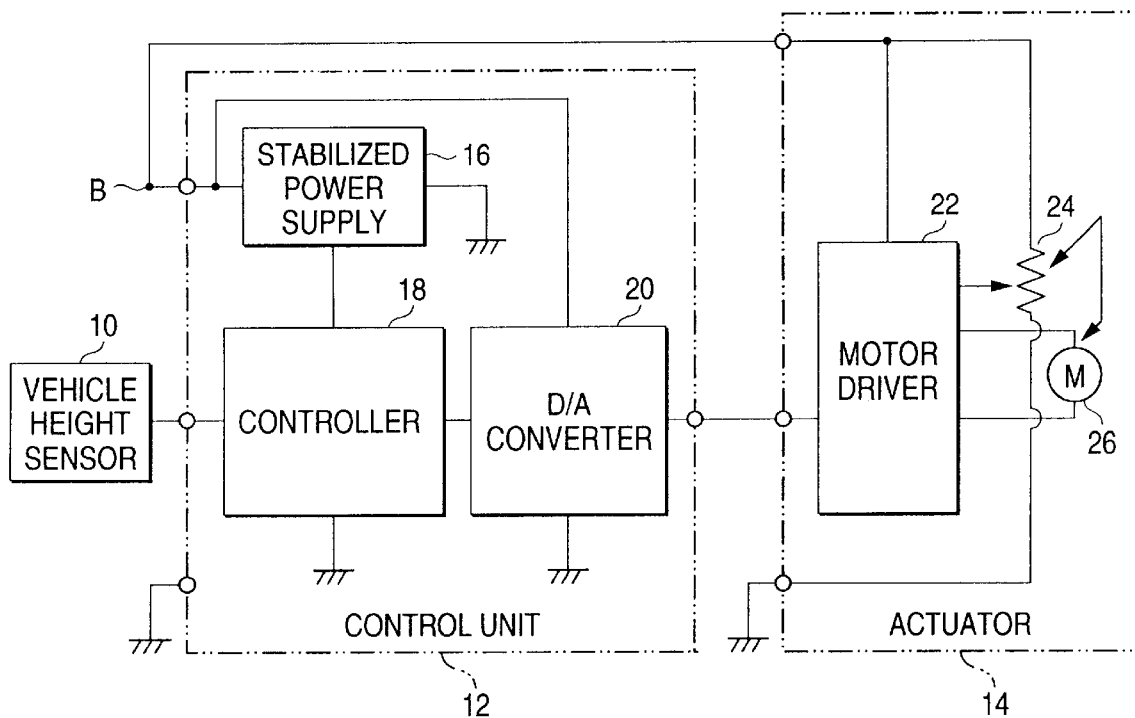
FIG. 1 is a schematic block diagram of an alignment device for a vehicle, which shows one embodiment of the invention.
Figure 2:
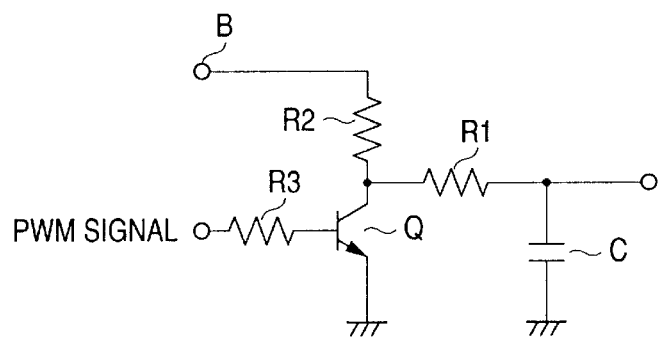
FIG. 2 is a circuit diagram implementation of a D/A converter.
Figure 3:
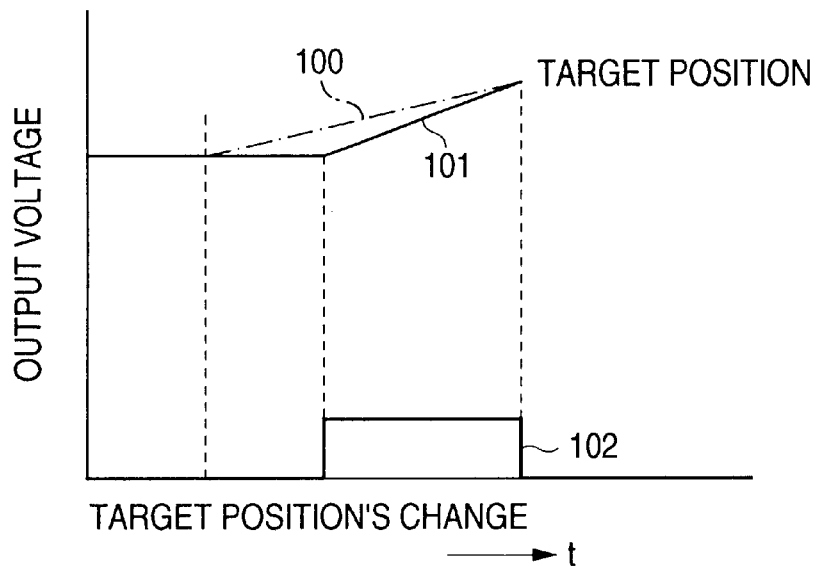
FIGS. 3(a) and 3(b) are waveform charts for explaining operation of the D/A converter.
Figure 3:
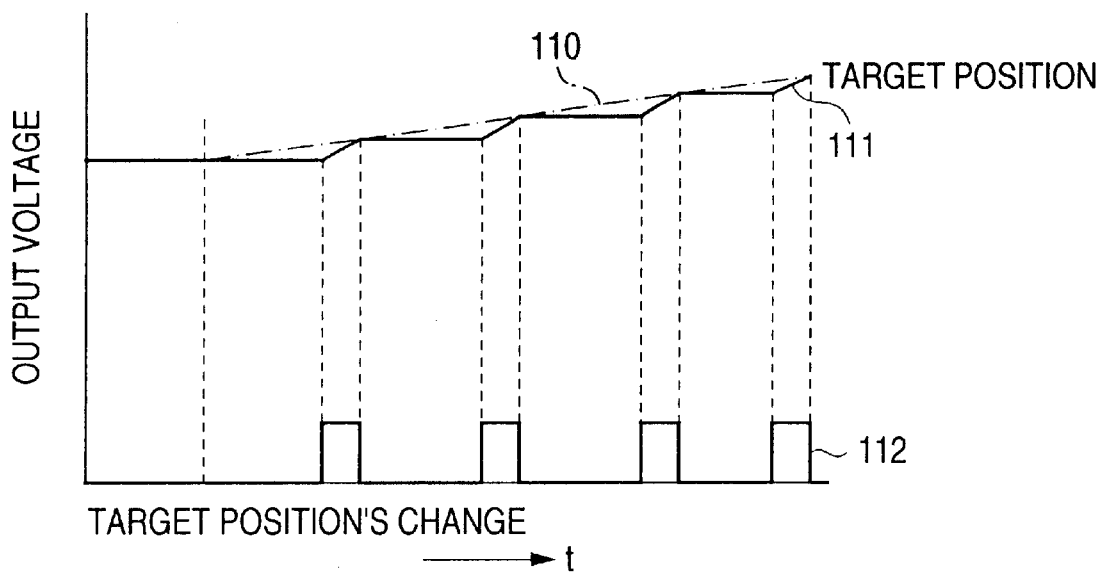
Figure 4:
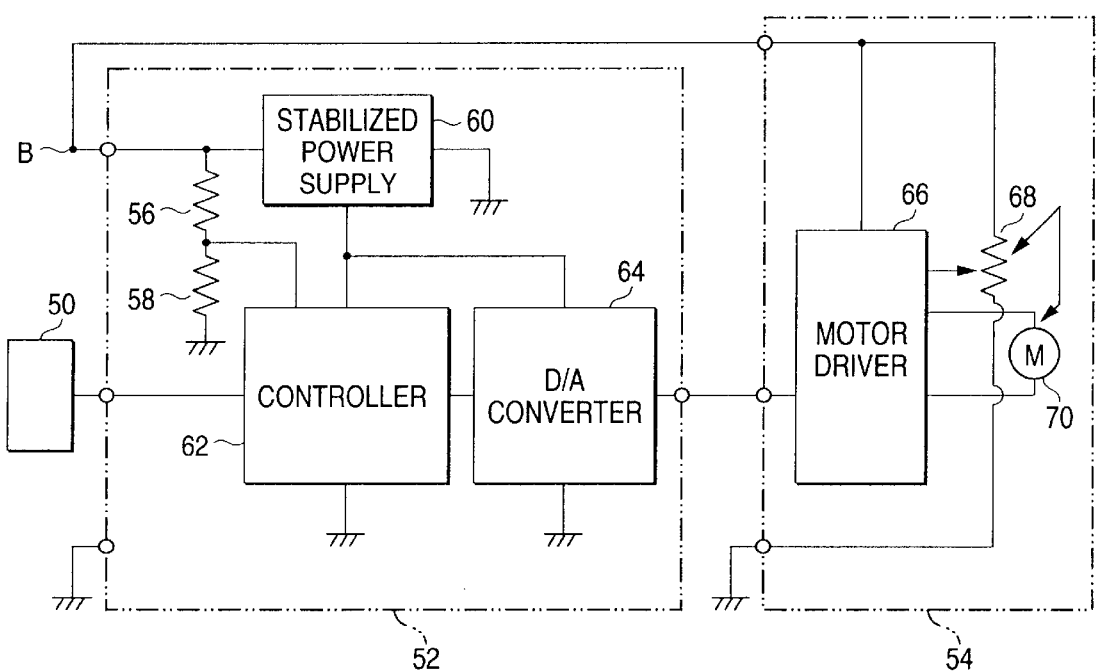
FIG. 4 is a schematic block diagram of a conventional alignment device for a vehicle.
Figure 5:
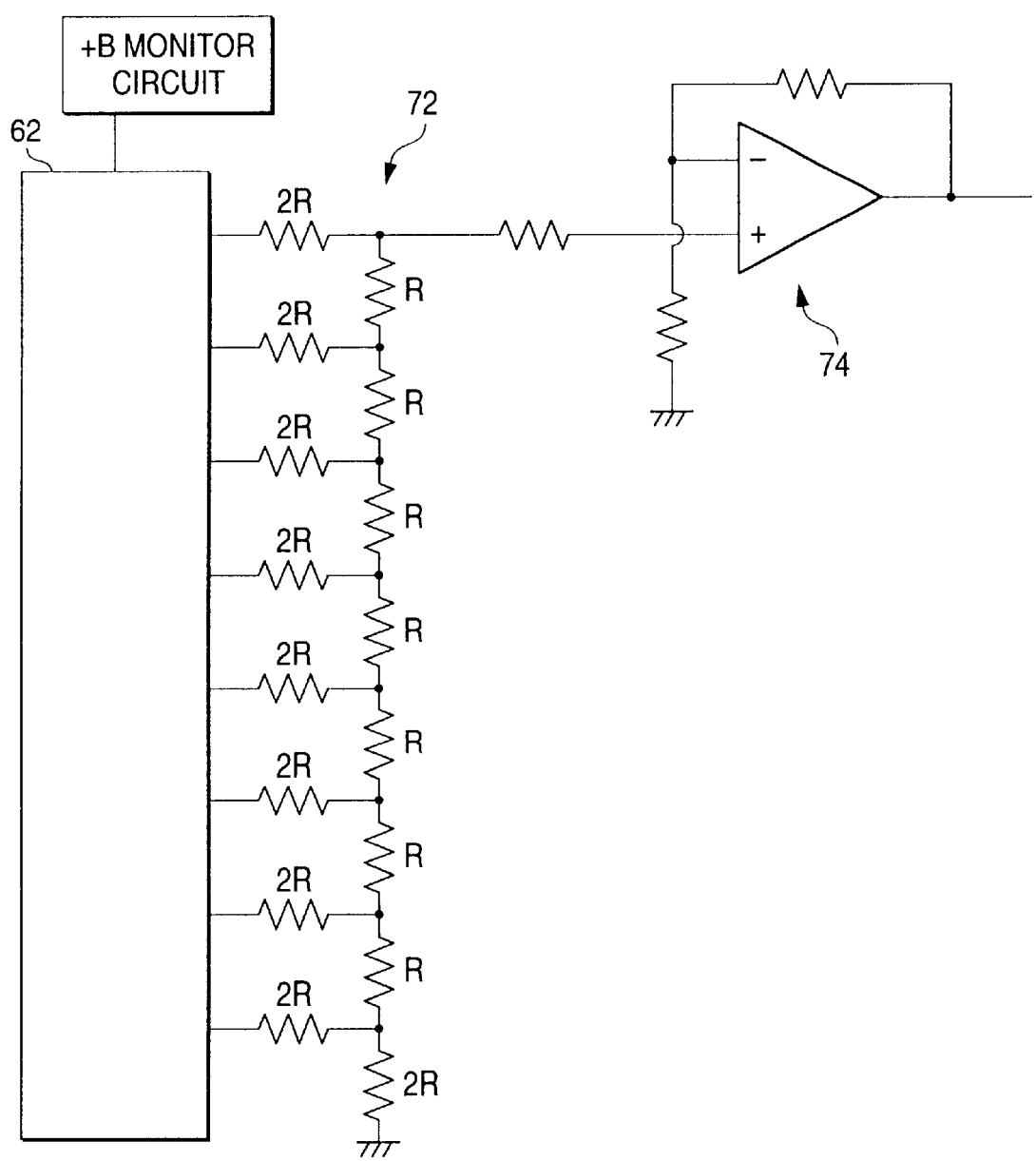
FIG. 5 is a circuit diagram of a conventional D/A converter.

FIGS. 1 to 3 show an embodiment of the invention. FIG. 1 is a schematic block diagram of an alignment device for a vehicle which is one embodiment of the invention, FIG. 2 is a circuit diagram of a DIA converter, and FIGS. 3(a) and 3(b) are wave form charts for explaining operation of the D/A converter.

In FIG. 1, an alignment device mounted in a vehicle such as an automobile is composed of a vehicle height sensor 10, a control unit 12 and an actuator 14. The control unit 12 and the actuator 14 are respectively connected to a vehicle power supply B.

The vehicle height sensor 10 serves as a vehicle attitude detecting means which detects an attitude of a vehicle and outputs an analog vehicle attitude detecting signal, or serves as a vehicle height detecting means which is arranged at axle portions in the front and in the rear of the vehicle and outputs a displacement amount of the vehicle height as an analog vehicle height detecting signal. The detection signal of the vehicle height sensor 10 is input to the control unit 12.

The control unit 12 is composed of a stabilized power supply 16, a controller 18 and a D/A converter 20. The stabilized power supply 16 is connected to the vehicle power supply B, the controller 18 is connected to the vehicle height sensor 10, and the D/A converter 20 is connected to the actuator 14. The stabilized power supply 16 receives the electric power from the vehicle height power supply B, converts a battery voltage into a stabilized voltage, and outputs the stabilized voltage to the controller 18.

The controller 18, for example, may be a microcomputer, and takes the analog detection signal detected by the vehicle height sensor 10 therein, converts this analog detection signal into a digital signal, executes an alignment operation in accordance with this digital signal, and outputs an alignment command signal (PWM signal). The pulse duration of the signal is modulated to the D/A converter 20 according to operation results. Consequently, the controller 18 is configured as an analog-to-digital conversion means and as an operation means.

FIG. 2 illustrates a circuit diagram of the D/A converter 20 which includes resistances R1, R2 and R3, a transistor Q, and condenser C. One end of the resistance R2 is connected to the vehicle power supply B, one end of the resistance R3 is connected to the controller 18, and one end of the condenser C is connected to the actuator 14. The transistor Q may be a bipolar transistor, and functions as a switching means to perform a switching operation in response to the alignment command signal (PWM signal) of which the pulse duration has been modulated, and generates a signal according to this switching operation.

The resistances R1 and R2, and the condenser C form a filter means which smoothes the signal accompanying the switching operation of the transistor Q, and form a charge and discharge circuit accompanying the switching operation of the transistor Q. In particular, when the level of the PWM signal input to the base of the transistor Q is low and the transistor Q is off, the electric current from the vehicle power supply B flows through the resistances R2 and R1 to the condenser C, and the charging electric current is stored in the condenser C. Conversely, when a high level PWM signal is input to the transistor Q and the transistor Q is switched on, the electric charge stored in the condenser C is discharged through the resistance R1 and the transistor Q, so that the voltages at both ends of the condenser C decreases. This charge and discharge circuit serves as a low pass filter. Since the resistance R2 in this charge and discharge circuit is of no relevance at the discharging time, the relation of the resistances R1 and R2 is set to R2<R1.

In addition, the time constant of the charge and discharge circuit including the resistances R1 and R2, and the condenser C, is set to be faster than the response speed of the actuator 14. A voltage obtained by multiplying the output voltage (battery voltage) of the vehicle power supply B by the voltage due to the PWM duty cycle of the alignment command signal (PWM signal), of which the pulse duration has been modulated, is output from both ends of the condenser C, and this output signal is input to the actuator 14.

The actuator 14 is composed of a motor driver 22, a potentiometer 24 and a motor 26. The motor driver 22 and the potentiometer 24 are connected to the vehicle power supply B. The potentiometer 24 cooperates with rotation of the motor 26, and is configured as a position detecting means which detects a rotational position of the motor 26. In particular, the position of an optical axis of a headlamp serving as a light source is detected, and the position detecting means outputs a positional signal to the motor driver 22. The motor driver 22 is configured as an alignment signal generating means. Upon reception of electric current from the vehicle power supply B, the motor driver 22 takes the output voltage of the charge and discharge circuit (the voltages at the both ends of the condenser C) from the D/A converter 20 therein, generates an alignment signal according to the deviation between this voltage and the output voltage of the potentiometer 24, and outputs this alignment signal to the motor 26. The motor 26 is configured as an alignment means which aligns the optical axis of the headlamp in accordance with the alignment signal from the motor driver 22. As the motor 26 rotates, a reflector within the lamp body of the headlamp tilts around a horizontal tilt axis, and the optical axis of the headlamp is aligned according to the rotation of the motor 26.

When the attitude of the vehicle, for example, a change of vehicle height, is detected by the vehicle height sensor 10 of the above alignment circuitry, a signal according to the change of the vehicle height is generated by the vehicle height sensor 10 and input to the controller 18. The controller 18 converts the detection signal from the vehicle height sensor 10 into a digital signal, performs an alignment operation on the basis of this digital signal, and outputs an alignment command signal (PMW signal) of which the pulse duration has been modulated to the D/A converter 20 according to the result of this operation. The transistor Q within the D/A converter 20 is switched on and off in response to the PWM signal. A signal according to the switching operation of the transistor Q is supplied to the charge and discharge circuit and smoothed by the charge and discharge circuit, and the smoothed signal is output from the both ends of the condenser C to the actuator 14. At this time, in the case that the controller 18 outputs an 8-bit PWM signal, a PWM signal of 256 gradations is output. Therefore, even if the battery voltage varies, the variation of the battery voltage is absorbed by smoothing the signal accompanying the switching operation of the transistor Q. As a result, the condenser can generate a voltage according to the vehicle height without adding any voltage variations of the supply voltage. When the voltages at both ends of the condenser C are input to the actuator 14, the motor 26 is driven to rotate according to the deviation between the detection output of the potentiometer 24 and the voltages at both ends of the condenser C. Thus, the motor 26 is driven so that the input voltage of the motor driver 22 coincides with the detection voltage of the potentiometer 24. Therefore, even if the vehicle height changes, the optical axis of the headlamp can be aligned in a fixed position.

As described above, after the PWM signal is smoothed, it is output to the actuator 14. Therefore, without monitoring the variation of the supply voltage of the vehicle power supply B, the optical axis of the headlamp can be corrected according to the change of the vehicle height, and the number of parts can be reduced. Further, even if the PWM signal of 8 bits and 256 gradations is output from the controller 18, it is possible to prevent reduction of the positional accuracy of the actuator.

Further, in the embodiment. the time constant of the charge and discharge circuit of the D/A converter 20 is set to be faster than the response speed of the actuator 14. Therefore, the life of the motor 26 can be lengthened, and the optical axis of the lamp can be aligned quickly. In particular. in the case that the time constant of the charge and discharge circuit is set to be faster than the response speed of the actuator 14, as shown in FIG. 3A, the output voltage (waveform 101 ) of the potentiometer 24 changes so as to follow the output voltage (waveform 100) of the D/A converter 20, and the motor 26, as shown by a waveform 102, reaches a target position by one operation.

Conversely, when a cut-off frequency (frequency corresponding to the time constant of the charge and discharge circuit) of the low-pass filter, which is determined by $F=1/2\pi CR$, is set to be lower than the response speed of the actuator 14, as shown in FIG. 3B, the output voltage of the potentiometer 24 changes in a manner of the waveform 111 in relation to the output voltage of the D/A converter 20 (waveform 110). Hereby, the motor 26, as shown by a waveform 112, reaches the target position by repeating an on and off operation several times. Therefore, stress in the motor 26 due to the operation starting and braking operations increases, so that the life of the motor 26 is reduced.

The reason why the motor 26 does not operate quickly even if the output voltage of the D/A converter 20 changes is that the motor 26 includes hysteresis for controlling inertia.

Further, in the above embodiment, a field effect transistor (FET) can be substituted for the transistor Q.

As clear from the above description, according to the alignment device for vehicle of the first implementation. When the supply voltage of the vehicle power supply varies, since the signal accompanying the switching operation according to this variation of the supply voltage is smoothed and the variation of the supply voltage is absorbed by the smoothed signal, the alignment signal according to the deviation between the output signal of the filter means and the detection output of the position detecting means can be generated, whereby it is possible to prevent a reduction in the positional accuracy of the optical axis. Further, since it is not necessary to monitor the variation of the supply voltage of the vehicle power supply, an alignment device for vehicle can be provided having a reduced number of parts.

According to the alignment device for a vehicle of the second implementation, when the supply voltage of the vehicle power supply varies, since the signal accompanying the switching operation according to this variation of the supply voltage is smoothed and the variation of the supply voltage is absorbed by the smoothed signal, the alignment signal according to the deviation between the output signal of the filter means and the detection output of the position detecting means can be generated, whereby it is possible to prevent a reduction in the positional accuracy of the optical axis. Further, since it is not necessary to monitor the variation of the supply voltage of the vehicle power supply, the alignment device for vehicle can be provided having a reduced number of parts.

According to the third aspect, an alignment device can be provided, which can align the optical axis of the light source in the target position at once without repeating the on and off operation several times by the alignment means due to the alignment signal, which can contribute to lengthening the life of the alignment means, and which can align the optical axis quickly.

Several implementations of the invention have been described herein, but it should be understood that various additions and modifications could be made which fall within the scope of the following claims.

What is claimed is:

1. An alignment device for a vehicle comprising:
    vehicle attitude detecting means for detecting an attitude of a vehicle and then outputting an analog vehicle attitude detecting signal;
    analog-to-digital conversion means for converting the analog vehicle attitude detecting signal to a digital signal;
    operation means for executing an alignment operation in accordance with the digital signal and outputting an alignment command signal having a pulse duration modulated according to this operation result;
    switching means which responds to the alignment command signal upon reception of a supply of electric power from a vehicle power supply to perform a switching operation and for generating a switching signal according to this switching operation;
    filter means for smoothing the switching signal according to the switching operation and for generating an output signal;
    position detecting means for detecting the position of an optical axis upon reception of electric power from the vehicle power supply and for generating a detection output;
    alignment signal generating means which generates an alignment signal corresponding to the deviation between the output signal of the filter means and the detection output of the position detecting means; and
    alignment means for aligning the optical axis in response to the alignment signal.

2. The alignment device for a vehicle according to claim 1, wherein the filter means includes a charge and discharge circuit for charging and discharging an electric current from the vehicle power supply according to the switching operation of the switching means, wherein the time constant of this charge and discharge circuit is set to be faster than the response speed of the alignment means which responds to said alignment signal.

3. A method for aligning a vehicle headlamp comprising:
    detecting an attitude of a vehicle and generating an analog vehicle attitude signal;
    converting the analog vehicle attitude signal to a digital signal;
    executing an alignment operation in accordance with the digital signal and generating a pulse duration modulated command signal;
    performing a switching operation based on the command signal and reception of electric power from a vehicle power supply and generating a switching signal;
    smoothing the switching signal and generating a smoothed switching signal;
    detecting the position of an optical axis of the headlamp upon receipt of electric power from the vehicle power supply and generating a detection output signal;
    generating an alignment signal based on the deviation between the smoothed switching signal and the detection output signal; and
    aligning the optical axis of the headlamp in response to the alignment signal.

4. The alignment device for a vehicle according to claim 1, wherein said attitude of the vehicle represents the height of the vehicle.

5. The alignment device for a vehicle according to claim 3, wherein said attitude of the vehicle represents the height of the vehicle.

* * * * *